United States Patent
Takahashi

(10) Patent No.: US 12,131,582 B2
(45) Date of Patent: *Oct. 29, 2024

(54) FACIAL AUTHENTICATION DEVICE, FACIAL AUTHENTICATION METHOD, AND PROGRAM RECORDING MEDIUM

(71) Applicant: NEC Corporation, Tokyo (JP)

(72) Inventor: Koichi Takahashi, Tokyo (JP)

(73) Assignee: NEC CORPORATION, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 18/223,450

(22) Filed: Jul. 18, 2023

(65) Prior Publication Data

US 2023/0360435 A1 Nov. 9, 2023

Related U.S. Application Data

(63) Continuation of application No. 17/529,479, filed on Nov. 18, 2021, now Pat. No. 11,915,518, which is a (Continued)

(30) Foreign Application Priority Data

Jun. 26, 2017 (JP) ................. 2017-124335

(51) Int. Cl.
*G06V 40/16* (2022.01)
*G06T 7/73* (2017.01)
*G06V 10/75* (2022.01)

(52) U.S. Cl.
CPC .............. *G06V 40/171* (2022.01); *G06T 7/74* (2017.01); *G06V 10/758* (2022.01); (Continued)

(58) Field of Classification Search
CPC .. G06V 40/171; G06V 40/169; G06V 40/172; G06V 10/758; G06T 7/74; G06T 2207/30201

See application file for complete search history.

(56) References Cited

U.S. PATENT DOCUMENTS

| | | |
|---|---|---|
| 2005/0271245 A1 | 12/2005 | Al et al. |
| 2007/0046662 A1 | 3/2007 | Kawakami ......... G08K 9/00275 345/419 |

(Continued)

FOREIGN PATENT DOCUMENTS

| | | |
|---|---|---|
| JP | 2002-288670 A | 10/2002 |
| JP | 2008-003749 A | 1/2008 |

(Continued)

OTHER PUBLICATIONS

US Notice of Allowance for U.S. Appl. No. 17/529,479, mailed on Nov. 1, 2023.

(Continued)

*Primary Examiner* — Syed Haider

(57) ABSTRACT

This facial authentication device is provided with: a detecting means for detecting a plurality of facial feature point candidates, using a plurality of different techniques, for at least one facial feature point of a target face, from a plurality of facial images containing the target face; a reliability calculating means for calculating a reliability of each facial image, from statistical information obtained on the basis of the plurality of detected facial feature point candidates; and a selecting means for selecting a facial image to be used for authentication of the target face, from among the plurality of facial images, on the basis of the calculated reliabilities.

9 Claims, 9 Drawing Sheets

Related U.S. Application Data continuation of application No. 16/623,478, filed as application No. PCT/JP2018/023066 on Jun. 18, 2018, now Pat. No. 11,210,498.

(52) U.S. Cl.
CPC .......... *G06V 40/169* (2022.01); *G06V 40/172* (2022.01); *G06T 2207/30201* (2013.01)

(56) References Cited

U.S. PATENT DOCUMENTS

| | | |
|---|---|---|
| 2007/0127785 A1 | 6/2007 | Hiraizumi et al. |
| 2009/0309702 A1* | 12/2009 | Hirai ............... G06V 40/174 340/5.83 |
| 2009/0316962 A1 | 12/2009 | Sun et al. |
| 2011/0103695 A1 | 5/2011 | Sato ................ G06K 9/4604 382/190 |
| 2012/0328199 A1* | 12/2012 | Woo ................. G06V 10/50 382/197 |
| 2013/0070973 A1* | 3/2013 | Saito ............... G06V 10/993 382/118 |
| 2014/0044348 A1 | 2/2014 | Chen et al. |
| 2015/0110364 A1 | 4/2015 | Niinuma et al. |
| 2016/0330346 A1 | 11/2016 | Hayashi et al. |
| 2017/0068843 A1 | 3/2017 | Tian ................. G06K 9/00281 |
| 2018/0204052 A1* | 7/2018 | Li ..................... G06T 3/18 |
| 2018/0307896 A1 | 10/2018 | Tamura et al. |

FOREIGN PATENT DOCUMENTS

| | | |
|---|---|---|
| JP | 2011-22994 A | 2/2011 |
| JP | 2012-18593 A | 1/2012 |
| JP | 2013-196295 A | 9/2013 |
| JP | 2014-530424 A | 11/2014 |
| JP | 2015-195460 A | 11/2015 |
| JP | 2016-99939 A | 5/2016 |
| WO | 2010/044214 A1 | 4/2010 |
| WO | 2011/148596 A1 | 12/2011 |
| WO | 2013/122009 A1 | 8/2013 |

OTHER PUBLICATIONS

International Search Report in International Application No. PCT/JP2018/023066, issued on Sep. 4, 2018.

Written Opinion in International Application No. PCT/JP2018/023066, Issued on Sep. 4, 2018.

Timothy F. Cootes, et al., "Active Appearance Models", IEEE Transactions on Pattern Analysis and Machine Intelligence, vol. 23, No. 6, Jun. 2001, pp. 681-685 (5 pages total).

Xiangxin Zhu, et al., "Face Detection, Pose Estimation, and Landmark Localization in the Wild", Computer Vision and Pattern Recognition (CVPR), 2012 IEEE Conference (8 pages total).

Midori Shinkaku, et al., "Improvement of face recognition accuracy using eyes detection by Haar-like features", IEICE, 2009, p. 80 (1 page total).

Masahiko Omori et al., "A Simple Method to Extract the Best Shot from Sequential Images", Technical Report of IEICE, The Institute of Electronics, Information and Communication Engineers, HIP Human Information Processing, vol. 101, No. 423, Nov. 2011, pp. 27-32 (7 pgs. total).

Japanese Office Action for JP Application No. 2021-014435 mailed on Feb. 1, 2022 with English Translation.

US Office Action for U.S. Appl. No. 18/222,715, mailed on Mar. 14, 2024.

US Office Action for U.S. Appl. No. 18/223,357, mailed on Mar. 13, 2024.

U.S. Notice of Allowance for U.S. Appl. No. 18/223,357, mailed on Jul. 15, 2024.

U.S. Notice of Allowance for U.S. Appl. No. 18/222,715, mailed on Jul. 17, 2024.

* cited by examiner

FACIAL AUTHENTICATION DEVICE, FACIAL AUTHENTICATION METHOD, AND PROGRAM RECORDING MEDIUM

CROSS-REFERENCE TO RELATED APPLICATIONS

The present application is a continuation application of U.S. patent application Ser. No. 17/529,479 filed on Nov. 18, 2021, which is a continuation application of U.S. patent application Ser. No. 16/623,478 filed on Dec. 17, 2019, which issued as U.S. Pat. No. 11,210,498, which is a National Stage Entry of international application PCT/JP2018/023066, filed Jun. 18, 2018, which claims the benefit of priority from Japanese Patent Application 2017-124335 filed on Jun. 26, 2017, the disclosures of all of which are incorporated in their entirety by reference herein.

TECHNICAL FIELD

The present invention relates to a facial authentication device, a facial authentication method, and a program recording medium for performing facial authentication by using a face image.

BACKGROUND ART

A facial authentication technique of identifying an individual from a face image of a person is used in various scenes including a security field. For example, a video (moving image) captured by a surveillance camera is used in identifying a person from face information extracted from the moving image.

At the time of facial authentication using a moving image, when a face of a person is included in a range of a plurality of frames that constitute the moving image, performing facial authentication on all the frames each including the face increases calculation processing for the authentication, and takes time to acquire an authentication result. Further, a plurality of the frames include a frame including a face unsuitable for facial authentication, such as a face in which image blurring, partial covering, or the like exists. Thus, it is desirable to perform facial authentication by selecting, from a moving image, a frame suitable for facial authentication.

In facial authentication, a pre-registered collation face image including a face of a person desired to be identified is collated with a frame (hereinafter, referred to also as "a collation-target face image") that is selected from a moving image and includes a collation-target face. In the collation, distinctive feature points (hereinafter, referred to as face feature points) including facial organs such as eyes and a nose, a facial skeletal structure, and the like are detected from each of the collation face image and the collation-target face image, and the two images are collated with each other, based on the detected face feature points. As a result of the collation, it is determined whether or not the respective faces included in the collation face image and the collation-target face image are faces of the same person.

One example of a technique of selecting an image suitable for facial authentication is disclosed in PTL 1.

PTL 1 discloses an individual authentication device that detects an orientation of a face of a target user, performs face recognition depending on the orientation of the face, and performs individual authentication.

PTL 2 discloses a face recognition device that determines whether or not a covering object exists, based on a detection signal from a face-part detection unit, and induces a user to remove the covering object when the covering object exists.

PTL 3 discloses a face recognition device that controls, depending on a size of a face, a method of transferring face image data necessary for face recognition processing, and thereby reduces a transfer amount. PTL 4 discloses a face-feature-point position correction device that can output a highly accurate face-feature-point position even when low-reliability-degree information is input as to one or a plurality of face feature points.

NPL 1 discloses a face recognition method in which a face image without blinking is selected, and facial authentication is performed. NPLs 2 and 3 each disclose one example of a face-feature-point detection method.

NPL 4 discloses a technique of accurately extracting an eye area even in the case of a face image in which a face is tilted.

CITATION LIST

Patent Literature

[PTL 1] Japanese Unexamined Patent Application Publication No. 2002-288670
[PTL 2] Japanese Unexamined Patent Application Publication No. 2016-099939
[PTL 3] International Publication No. WO 2010/044214
[PTL 4] International Publication No. WO 2011/148596
[Non Patent Literature]
[NPL 1] Kunihiko Omori, Kazuto Murakami, "A Simple Method to Extract the Best Shot from Sequential Images", The Institute of Electronics, Information and Communication Engineers, Japan, Technical Report, HIP, Human Information Processing, 101(423), Nov. 8, 2001, pages 27 to 32
[NPL 2] T. F. Cootes, G. J. Edwards, C. J. Taylor, "Active appearance models", IEEE Transactions on pattern analysis and machine intelligence, Vol. 23, No. 6, June 2001, pages 681 to 685
[NPL 3] Xiangxin Zhu, Deva Ramanan, "Face detection, pose estimation, and landmark localization in the wild", Computer Vision and Pattern Recognition (CVPR), 2012 IEEE Conference on 2012
[NPL 4] Midori Shinkaku, and two others, "Improvement of Face Recognition Accuracy Using Eyes Detection by Haar-Like Features", [Online],
[Searching Date: May 15, 2017], Internet <https://www.ieice.org/tokyo/gakusei/kenkyuu/14/pdf/80.pdf>

SUMMARY OF INVENTION

Technical Problem

As described above, PTL 1 discloses that an image of a face oriented to the front is selected and collated with a pre-registered face image oriented to the front, and a person is thereby identified with high accuracy.

Meanwhile, collation between a collation face image and a collation-target face image performed in facial authentication has a problem that accuracy of the authentication tends to decline due to positional deviation of detected face feature points.

Herein, positional deviation refers to a state where face feature points such as eyes and a nose are detected at positions deviated from positions thereof in the face image. For example, when a face feature point indicating a pupil center of a right eye is detected in a certain face image, a point on a left side of or a point on a right side of the pupil of the right eye is detected as a face feature point in some cases. A state where a face feature point is thus detected at a position deviated from a detection-desired position such as a pupil center of a right eye is referred to as positional deviation. The positional deviation is caused by a lot of noise included in a face image, a small size of a face included therein, a covering over a face, or the like, for example.

When the above-described positional deviation occurs, face images are collated with each other in a state where face feature points to be compared are detected at positions deviated from each other between a collation face image and a collation-target face image. For this reason, there is a problem that accuracy of facial authentication declines.

The technique disclosed in PTL 1 can prevent a combination of a side face and a front face from being used in facial authentication, but cannot prevent a decline in accuracy of facial authentication being caused by positional deviation of a detected face feature point.

PTLs 2 to 4 and NPLs 1 to 4 also do not disclose prevention of a decline in accuracy of facial authentication being caused by positional deviation of a detected face feature point.

The present invention has been made in view of the above-described problem, and mainly aims to provide a facial authentication device and the like that can suppress influence of positional deviation of a detected face feature point and achieve highly accurate facial authentication.

Solution to Problem

An aspect of the present invention is a facial authentication device. The facial authentication device includes detection means for detecting, from each of a plurality of face images including a target face, a plurality of face-feature-point candidates for at least one face feature point of the target face, by using a plurality of different methods; reliability degree calculation means for calculating a reliability degree of each of face images, from statistical information acquired based on the plurality of detected face-feature-point candidates; and selection means for selecting, based on the calculated reliability degrees, from the plurality of face images, a face image to be used in authentication of the target face.

An aspect of the present invention is a facial authentication method. The facial authentication method includes detecting, from each of a plurality of face images including a target face, a plurality of face-feature-point candidates for at least one face feature point of the target face, by using a plurality of different methods; calculating a reliability degree of each of face images, from statistical information acquired based on the plurality of detected face-feature-point candidates; and selecting, based on the calculated reliability degrees, from the plurality of face images, a face image to be used in authentication of the target face.

An aspect of the present invention is a program recording medium. The program recording medium records a program causing a computer to execute: processing of detecting, from each of a plurality of face images including a target face, a plurality of face-feature-point candidates for at least one face feature point of the target face, by using a plurality of different methods; processing of calculating a reliability degree of each of face images, from statistical information acquired based on the plurality of detected face-feature-point candidates; and processing of selecting, based on the calculated reliability degrees, from the plurality of face images, a face image to be used in authentication of the target face.

Advantageous Effects of Invention

According to the present invention, it is possible to attain an advantageous effect that influence of positional deviation of a detected face feature point can be suppressed, and highly accurate facial authentication can be achieved.

EXAMPLE EMBODIMENT

Hereinafter, example embodiments of the present invention are described in detail with reference to the drawings.

First Example Embodiment

Figure 1:
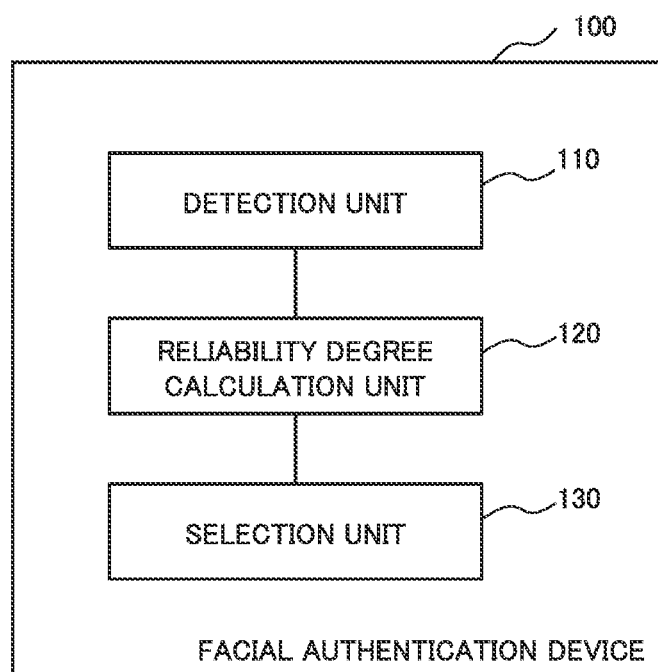
FIG. 1 is a block diagram illustrating a configuration of a facial authentication device according to a first example embodiment of the present invention.

FIG. 1 is a block diagram illustrating a configuration of a facial authentication device 100 according to a first example embodiment of the present invention. As illustrated in FIG. 1, the facial authentication device 100 includes a detection unit 110, a reliability degree calculation unit 120, and a selection unit 130.

The detection unit 110 detects a plurality of face-feature-point candidates for at least one face feature point of a target face, from each of a plurality of face images each including the target face, by using a plurality of different methods. The reliability degree calculation unit 120 calculates a reliability degree of each of the face images from statistical information acquired based on a plurality of the detected face-feature-point candidates. Based on the calculated reliability degrees, the selection unit 130 selects from a plurality of the face images the face image used in authentication of the target face.

Note that the detection unit 110, the reliability degree calculation unit 120, and the selection unit 130 are implemented by a face-feature-point candidate detection unit 231, a reliability degree calculation unit 232, and a face image selection unit 233 respectively as one example which are described in the following example embodiment.

According to the first example embodiment, a face image in which a face feature point is detected with high accuracy is selected from a plurality of face images, and the selected face image is used in authentication, thus attaining an advantageous effect that influence of positional deviation of a detected face feature point can be suppressed, and highly accurate facial authentication can be achieved.

Second Example Embodiment

Figure 2:
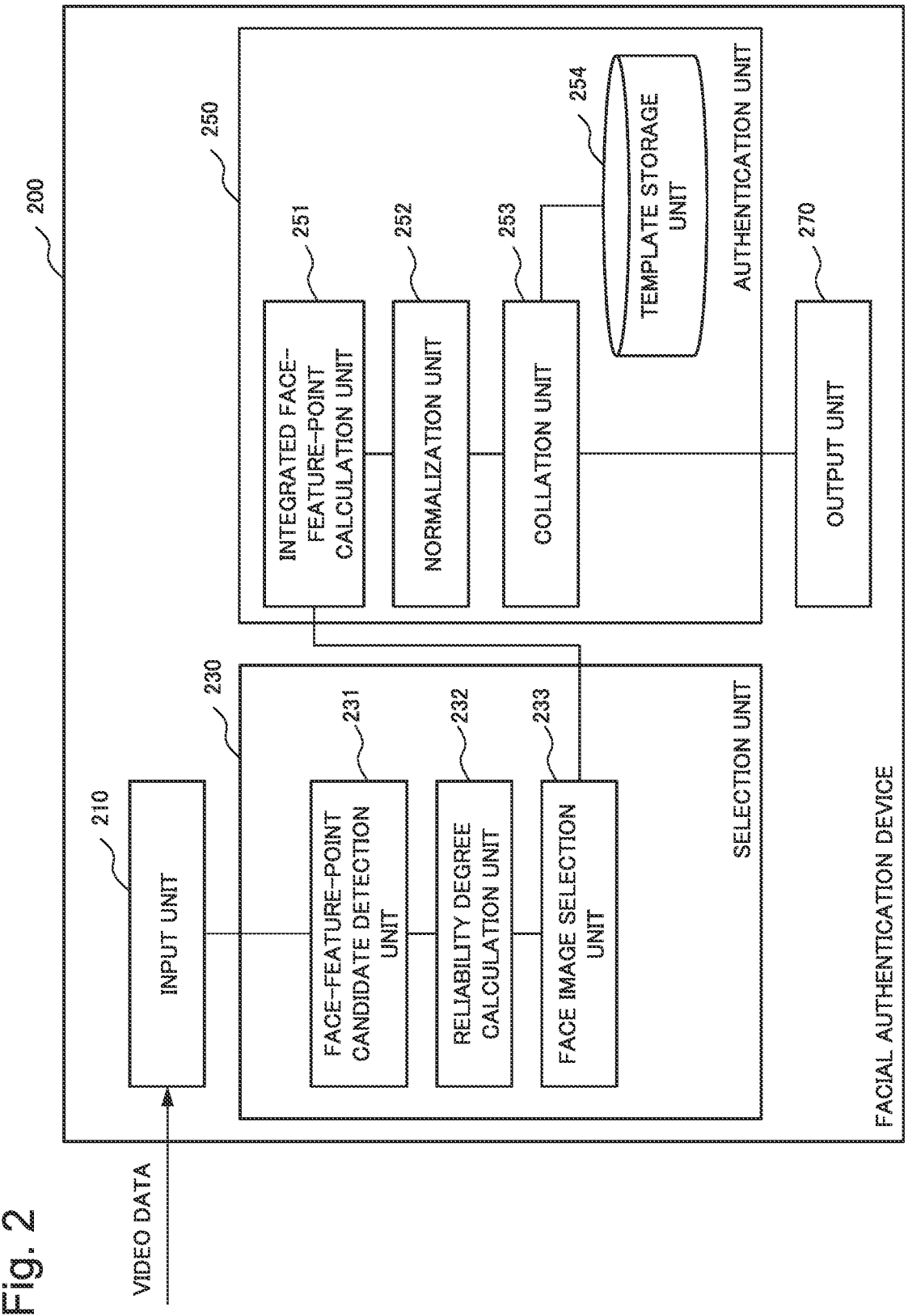
FIG. 2 is a block diagram illustrating a configuration of a facial authentication device according to a second example embodiment of the present invention.

FIG. 2 is a block diagram illustrating a configuration of a facial authentication device 200 according to a second example embodiment of the present invention. As illustrated in FIG. 2, the facial authentication device 200 includes an input unit 210, a selection unit 230, an authentication unit 250, and an output unit 270.

The selection unit 230 includes a face-feature-point candidate detection unit 231, a reliability degree calculation unit 232, and a face image selection unit 233. The authentication unit 250 includes an integrated face feature point calculation unit 251, a normalization unit 252, a collation unit 253, and a template storage unit 254.

The input unit 210 acquires video (moving image) data generated by a monitoring camera or the like. The video data include a plurality of frames (still images) each including a face of a person.

The selection unit 230 has a function of selecting a frame used in collation for the below-described facial authentication, from a plurality of the consecutive frames constituting the video data acquired by the input unit 210.

The authentication unit 250 has a function of performing the facial authentication on the target face, based on the frame selected by the selection unit 230. The output unit 270 outputs a result of the authentication performed by the authentication unit 250.

The following describes an outline of each constituent element of the selection unit 230.

The face-feature-point candidate detection unit 231 acquires, from video data acquired by the input unit 210, face images that are frames each including a face, and detects candidates (hereinafter, referred to also as "face-feature-point candidates") of a face feature point from each of the acquired face images, by using a plurality of different face-feature-point detection methods.

The face feature point is defined based on information such as an organ and a skeletal structure of a face. For example, a mouth corner, a pupil center, and the like are used as detection-target face feature points. The face-feature-point candidate detection unit 231 detects a plurality of face-feature-point candidates for each of the detection-target face feature points, using a plurality of different face-feature-point detection methods.

The reliability degree calculation unit 232 calculates a reliability degree of each of the face images, based on statistical information of a plurality of the face-feature-point candidates detected by the face-feature-point candidate detection unit 231 (details are described below). An example used as the statistical information is variance of respective positions (coordinate values) of the face-feature-point candidates.

The face image selection unit 233 selects the face image suitable for facial authentication, based on the reliability degrees of the respective face images calculated by the reliability degree calculation unit 232. The face image selection unit 233 may select a face image whose reliability degree is the maximum value, or may select the face image whose reliability degree is equal to or larger than a threshold value.

In the above-described procedure, a face image suitable for the facial authentication is selected.

Next, an outline of each constituent element of the authentication unit 250 is described.

For a face image selected by the face image selection unit 233, the integrated face-feature-point calculation unit 251 calculates, based on a plurality of face-feature-point candidates detected for each of detection-target face feature points, an integrated face feature point used in collation for facial authentication. The integrated face-feature-point calculation unit 251 may calculate the integrated face feature point, for example, based on an average of positions (coordinate values) of the respective face-feature-point candidates.

The normalization unit 252 corrects and normalize a position and an orientation of the face, based on the face image selected by the face image selection unit 233 and the integrated face feature points calculated by the integrated face-feature-point calculation unit 251. In the calculation processing for the normalization, well-known normalization device and normalization technique can be used.

The collation unit 253 generates a face collation template from the image (hereinafter, referred to also as "the normalized image") normalized by the normalization unit 252, and collates the generated face collation template with a template stored in the template storage unit 254, thereby performing facial authentication, and identifying a person included in video data.

The template storage unit 254 stores the face collation template of a person desired to be identified.

The output unit 270 outputs as a result of the facial authentication the person identified by the collation unit 253. For example, the output unit 270 may output the identified person to a display.

Figure 3:
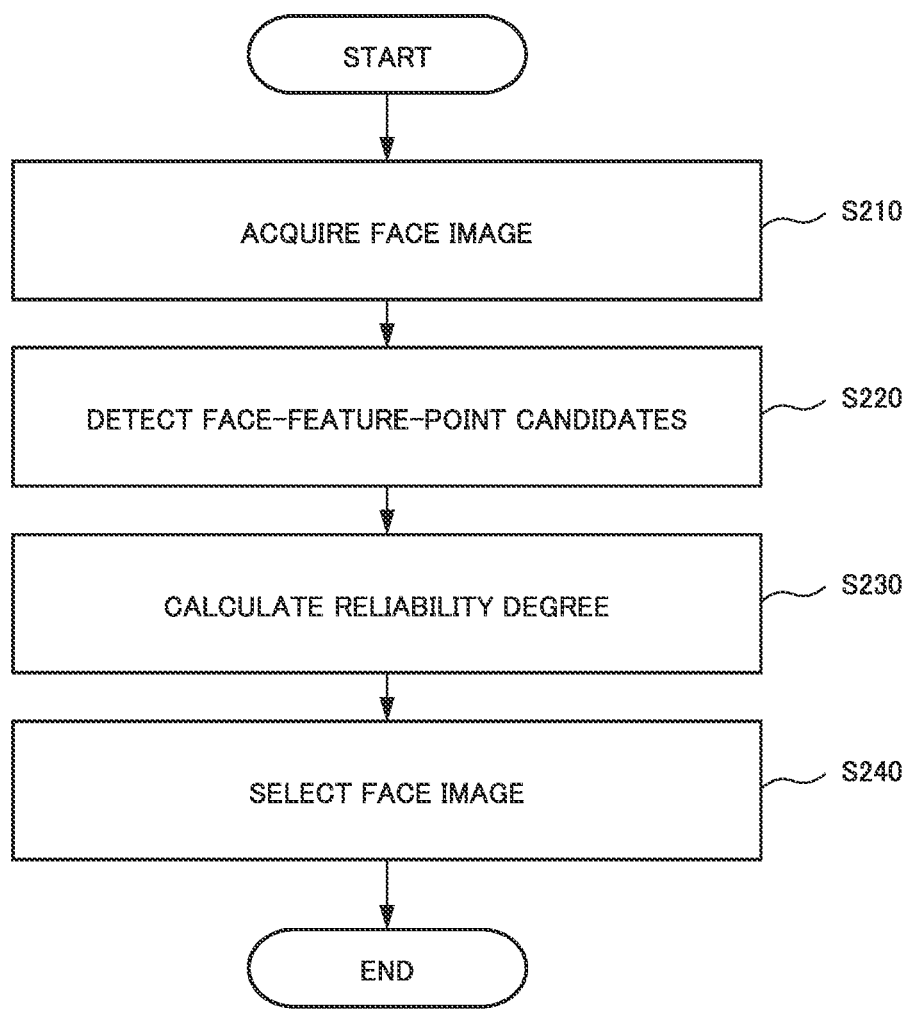
FIG. 3 is a flowchart that illustrates processing performed by a selection unit of the facial authentication device according to the second example embodiment of the present invention.

FIG. 3 is a flowchart that illustrates processing in which the selection unit 230 of the facial authentication device 200 according to the second example embodiment selects from video data a face image suitable for facial authentication. With reference to FIG. 3, the following describes the processing performed by the selection unit 230.

The input unit 210 in FIG. 2 acquires video data from an external monitoring camera or the like. From the video data acquired by the input unit 210, the face-feature-point candidate detection unit 231 acquires a face image that is a frame including a face (step S210). As to the acquired face image, the face-feature-point candidate detection unit 231 detects a plurality of face-feature-point candidates for each of detection-target face feature points, by using a plurality of different face-feature-point detection methods (step S220).

Figure 4:
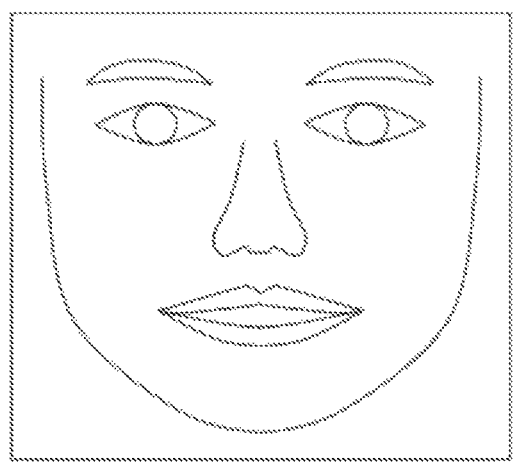
FIG. 4 is a diagram illustrating one example of a face area included in a face image acquired by a face-feature-point candidate detection unit of the facial authentication device according to the second example embodiment of the present invention.
Figure 5:
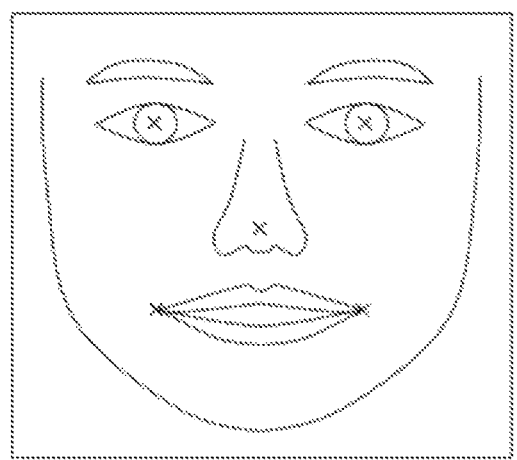
FIG. 5 is a diagram illustrating an example of face feature points as detection targets of the face-feature-point candidate detection unit of the facial authentication device according to the second example embodiment of the present invention.

FIG. 4 is an enlarged view illustrating an area (hereinafter, referred to also as "a face area") that includes a face and that is included in the face image acquired by the face-feature-point candidate detection unit 231. FIG. 5 is a diagram illustrating an example of face feature points that are detection targets of the face-feature-point candidate detection unit 231. In the example illustrated in FIG. 5, the detection-target face feature points are indicated by the marks "x". The example illustrated in FIG. 5 indicates that five points of a pupil center of a right eye, a pupil center of a left eye, a top portion of a nose, a right mouth corner, and a left mouth corner are the detection-target face feature points.

By using a plurality of different face-feature-point detection methods, the face-feature-point candidate detection unit 231 detects a plurality of face-feature-point candidates for each of the above-described five points, for example. Assuming that the number of a plurality of the different face-feature-point detection methods used by the face-feature-point candidate detection unit 231 is n (n is an integer equal to or larger than two), the face-feature-point candidates are defined as a set of n face feature points.

Figure 6A:
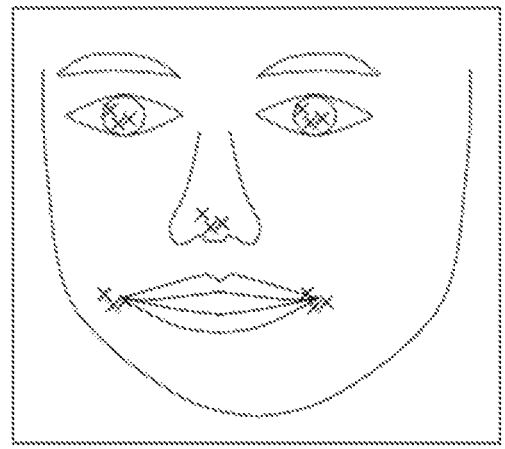
FIG. 6A is a diagram illustrating an example of face-feature-point candidates detected by the face-feature-point candidate detection unit of the facial authentication device according to the second example embodiment of the present invention.
Figure 6B:
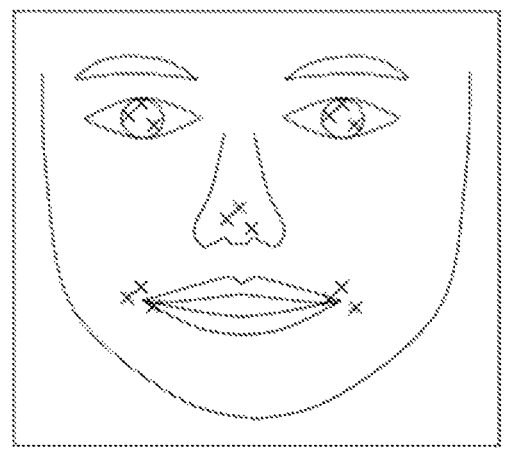
FIG. 6B is a diagram illustrating an example of face-feature-point candidates detected by the face-feature-point candidate detection unit of the facial authentication device according to the second example embodiment of the present invention.
Figure 6C:
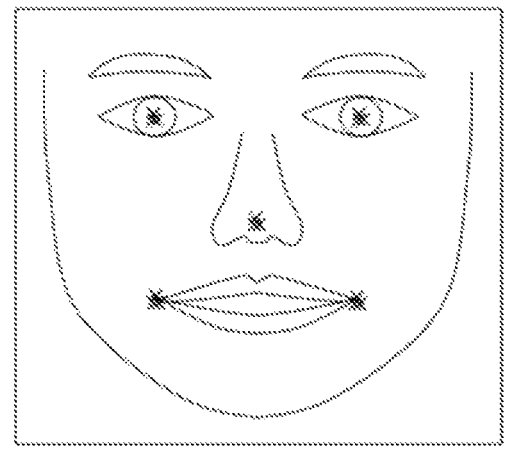
FIG. 6C is a diagram illustrating an example of face-feature-point candidates detected by the face-feature-point candidate detection unit of the facial authentication device according to the second example embodiment of the present invention.

FIG. 6A to FIG. 6C are diagrams illustrating respective examples of face-feature-point candidates detected in respective face areas included in three face images acquired from video data. For example, face-feature-point candidates may be detected for each of face areas of a certain person in three consecutive face images that are included in video data and each of which includes a face of the person, but there is no limitation to this.

FIG. 6A to FIG. 6C illustrate the examples in which for each of the face areas included in the three face images, the face-feature-point candidate detection unit 231 detects three face-feature-point candidates for each of the above-described five points (a pupil center of a right eye, a pupil center of a left eye, a top portion of a nose, a right mouth corner, and a left mouth corner), by using three respective different face-feature-point detection methods.

Herein, examples used as the face-feature-point detection methods may include the face-feature-point detection method described in NPL 2 or NPL 3. These methods are examples, and other methods may be used.

Alternatively, a well-known face-feature-point detection method in which different data sets are learned may be used as a plurality of different face-feature-point detection methods. For example, data set is randomly divided into two sets, and each of the data sets is learned by the face-feature-point detection method described in NPL 2, for example. The thus-acquired two kinds of models may be used as two different kinds of face-feature-point detection methods.

Alternatively, a well-known face-feature-point detection method in which respective data sets represented by respective different feature quantities are learned may be used as a plurality of different face-feature-point detection methods. For example, a data set represented by RGB values of a color image and a data set represented by gray-scale converted luminance values are learned by the face-feature-point detection method described in NPL 2, for example. The thus-acquired two kinds of models may be used as two different kinds of face-feature-point detection methods.

Subsequently, the reliability degree calculation unit 232 calculates a reliability degree of each of the face images, based on statistical information of a plurality of face-feature-point candidates detected by the face-feature-point candidate detection unit 231 as described above (step S230).

The reliability degree calculation unit 232 may use, as the statistical information, variance of respective positions of the face-feature-point candidates. Specifically, the reliability degree calculation unit 232 calculates a reliability degree of the face image in the following procedure, for example.

Figure 7:
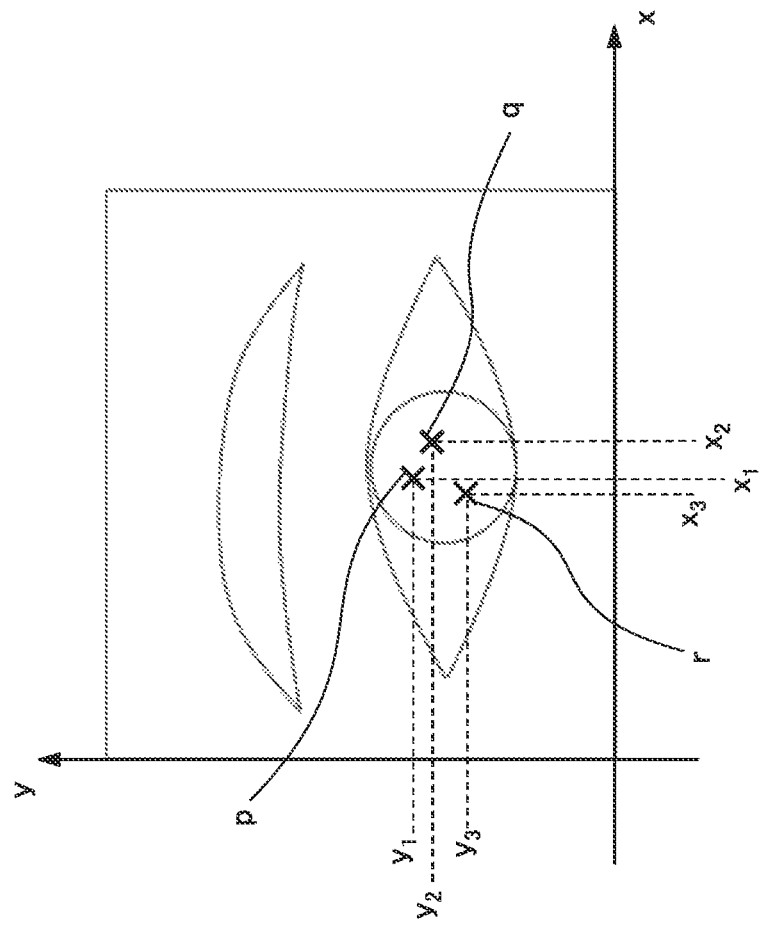
FIG. 7 is a diagram illustrating one example of an eye area where face-feature-point candidates are detected by the face-feature-point candidate detection unit of the facial authentication device according to the second example embodiment of the present invention.

FIG. 7 is an enlarged view of an area (hereinafter, referred to also as "an eye area") that includes an eye and that is included in the face area where face-feature-point candidates are detected as illustrated in FIG. 6A, for example. FIG. 7 illustrates that three points p, q, and r as face-feature-point candidates of a pupil center in the right eye are detected.

It is assumed that in the eye area illustrated in FIG. 7, for example, an xy coordinate system has an x-axis of a horizontal direction of the image and a y-axis of a vertical direction of the image, and coordinate values of the face-feature-point candidates p, q, r are $p(x_1, y_1)$, $q(x_2, y_2)$, and $r(x_3, y_3)$ respectively.

In this case, variance v of respective positions of the face-feature-point candidates is calculated by the Equation (1), for example.

$$v=(1/3)*((x_1-m)^2+(y_1-n)^2+(x_2-m)^2+(y_2-n)^2+(x_3-m)^2+(y_3-n)^2) \quad (1)$$

where $$m=(1/3)*(x_1+x_2+x_3)$$

$$n=(1/3)*(y_1+y_2+y_3)$$

Note that in the Equation (1) and the following Equations, "/", "*", and "^" designate a division, a multiplication, and a power respectively.

By using the Equation (1), the reliability degree calculation unit 232 calculates variance v of respective positions of face-feature-point candidates also for each of the detected face feature points such as a top portion of a nose and a mouth corner, as in the case of the above-described pupil center of the right eye.

Subsequently, the reliability degree calculation unit 232 calculates an average value of the variance v acquired for the respective detected face feature points, i.e., average variance u. Here, assuming that the variance of the respective face-feature-point candidates for the pupil center of the right eye, the pupil center of the left eye, the top portion of the nose, the right mouth corner, and the left mouth corner are $v_1$, $v_2$, $v_3$, $v_4$, and $v_5$ respectively, the average variance u is calculated by the Equation (2).

$$u=(1/5)*(v_1+v_2+v_3+v_4+v_5) \quad (2)$$

Subsequently, the reliability degree calculation unit 232 calculates a negative exponential function of the average variance u by the following Equation (3), thereby calculating a reliability degree s.

$$s=\exp(-u) \quad (3)$$

The reliability degree s takes a value equal to or larger than zero and equal to or smaller than one.

Note that as described above, the reliability degree calculation unit 232 uses, as the statistical information, variance of respective positions of face-feature-point candidates, and uses a negative exponential function of average variance in calculating a reliability degree, but there is no limitation to this. For example, the reliability degree calculation unit 232 may use a standard deviation instead of variance. Further, the reliability degree calculation unit 232 may use a sigmoid function instead of a negative exponential function of average variance.

Further, although in the above description, a reliability degree is calculated based on an average of variance of respective positions of face-feature-point candidates for every detection-target face feature point, there is no limitation to this. For example, the reliability degree calculation unit 232 may calculate a reliability degree, based on variance of respective positions of face-feature-point candidates for at least one of detection-target face feature points.

Subsequently, the face image selection unit 233 selects a face image suitable for facial authentication, based on reliability degrees calculated as described above (step S240). Specifically, the face image selection unit 233 may select, as a face image suitable for facial authentication, a face image whose reliability degree calculated by the reliability degree calculation unit 232 is the maximum value. For example, from the diagrams illustrated in FIG. 6A to FIG. 6C, the face image selection unit 233 may select, as a face image suitable for facial authentication, FIG. 6C whose reliability degree is the maximum value, i.e., whose variation of the respective positions of the face-feature-point candidates is smallest.

Alternatively, for example, the face image selection unit 233 may select a face image having a reliability degree equal to or larger than an arbitrary threshold value. In this case, a plurality of face images may be selected.

As described above, a face image is selected by using a reliability degree based on an average of variance of the face-feature-point candidates, and thereby, for example, a face image whose variation of respective positions of face-feature-point candidates is large can be excluded from a face image used in facial authentication.

For example, as to a face image including a face in which a mouth is covered with a hand, a position of a feature point of the mouth is ambiguous, and thus, variance of face-feature-point candidates of the mouth increases. Such a face image can be excluded from a face image used in facial authentication when a reliability degree based on an average of variance of respective positions of face-feature-point candidates is used as described above.

In the above procedure, the selection unit 230 selects a face image suitable for facial authentication.

Figure 8:
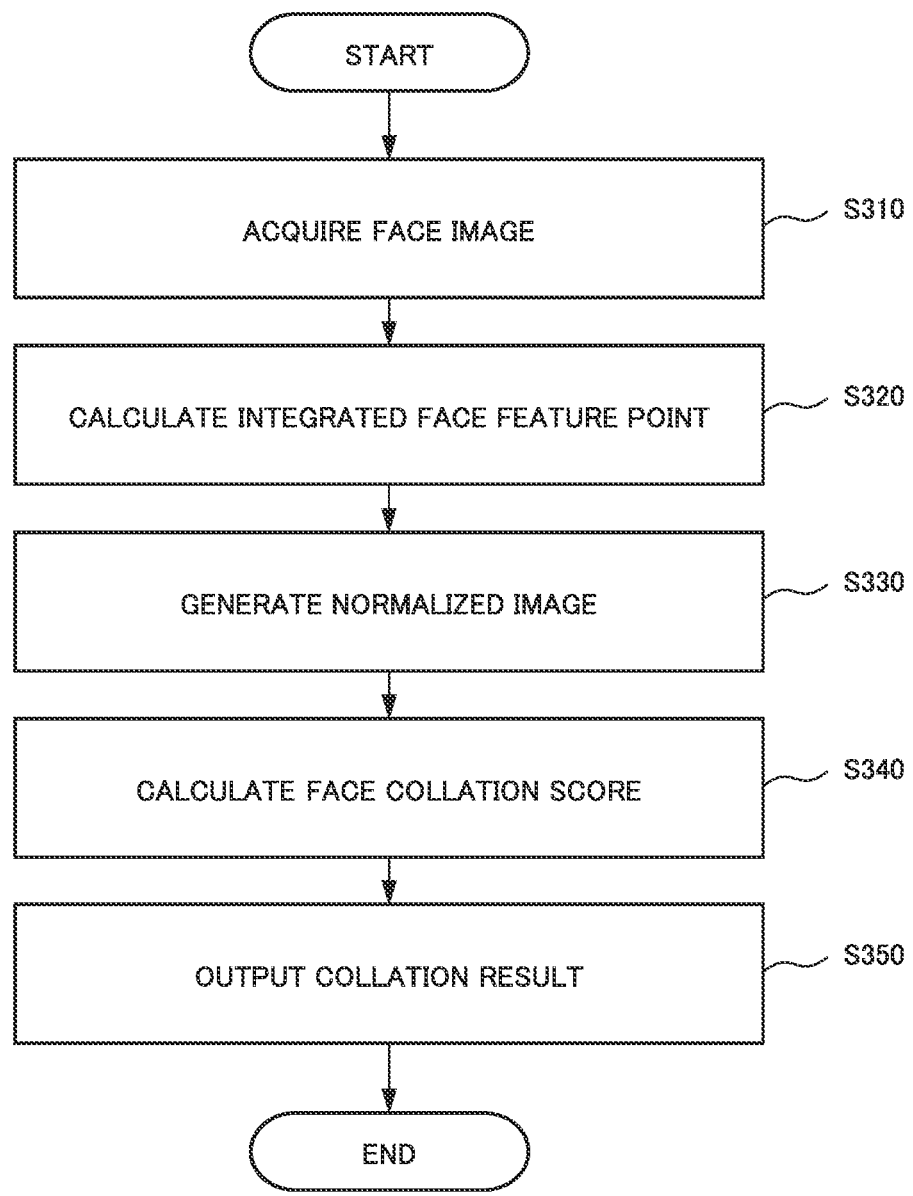
FIG. 8 is a flowchart illustrating processing performed by an authentication unit of the facial authentication device according to the second example embodiment of the present invention.

FIG. 8 is a flowchart illustrating processing in which the authentication unit 250 of the facial authentication device 200 according to the second example embodiment performs facial authentication, by using a face image selected by the selection unit 230.

With reference to FIG. 8, the following describes the processing performed by the authentication unit 250.

The integrated face-feature-point calculation unit 251 of the authentication unit 250 acquires a selected face image from the face image selection unit 233 (step S310). For the acquired face image, based on a plurality of face-feature-point candidates detected for each of detection-target face feature points, the integrated face-feature-point calculation unit 251 calculates an integrated face feature point used in collation (Step S320). Specifically, for example, the integrated face-feature-point calculation unit 251 calculates an average value of respective coordinate values of a plurality of the face-feature-point candidates, and sets the average value as a coordinate value of the integrated face feature point.

Figure 9:
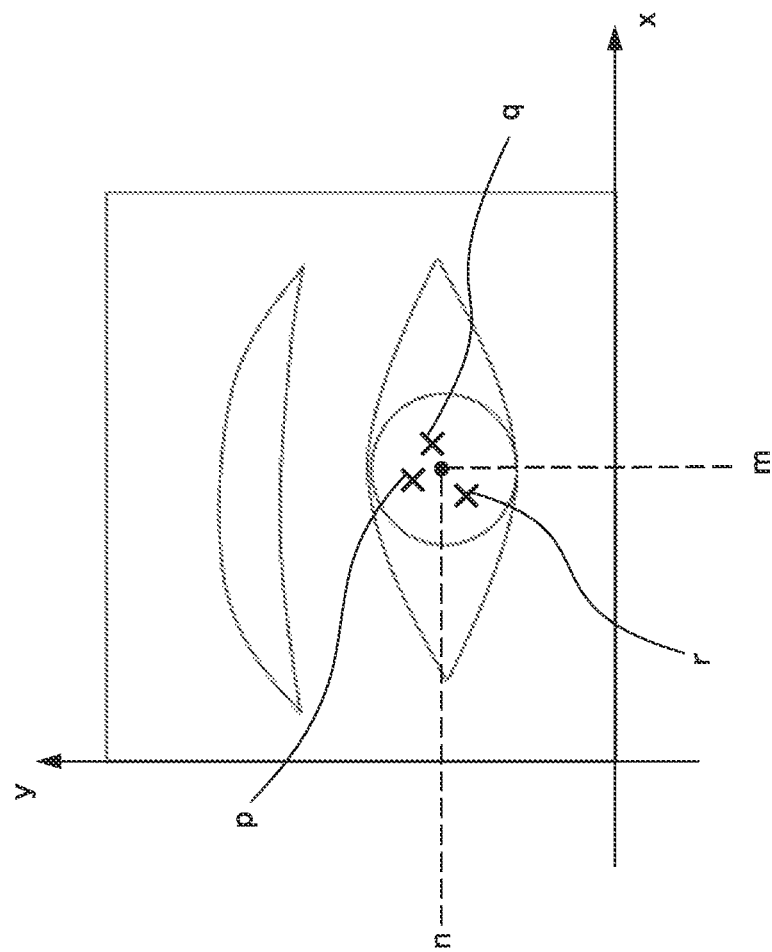
FIG. 9 is a diagram illustrating one example of coordinate values of face-feature-point candidates calculated by an integrated face-feature-point calculation unit of the facial authentication device according to the second example embodiment of the present invention.

FIG. 9 is a diagram illustrating an example in which as to the example illustrated in FIG. 7, an average value of the respective coordinate values of a plurality of the face-feature-point candidates concerning the pupil center of the right eye is calculated as a coordinate value of an integrated face feature point. As illustrated in FIG. 9, the integrated face-feature-point calculation unit 251 calculates the average value (m, n) of the respective coordinate values of the face-feature-point candidates p, q, and r, i.e., calculates $$m=(\tfrac{1}{3})*(x_1+x_2+x_3) \text{ and}$$

$$n=(\tfrac{1}{3})*(y_1+y_2+y_3)$$

as an x coordinate value and a y coordinate value of the integrated face feature point, respectively.

Integrating a plurality of face-feature-point candidates in this manner enables face-feature-point detection to be made more accurately than in the case of using a face feature point detected by one certain method.

Note that the integrated face-feature-point calculation unit 251 may set, as a coordinate value of an integrated face feature point, a weighted average value of coordinate values that is acquired by applying an arbitrary weight to each of the face-feature-point candidates.

Subsequently, the normalization unit 252 corrects a position and an orientation of the face, based on the face image selected by the face image selection unit 233 and an integrated face feature point calculated by the integrated face-feature-point calculation unit 251, and thereby normalizes the face image (step S330). Herein, the normalization refers to processing of adjusting positions of face parts such as eyes and a mouth in order to perform face collation between face images.

For example, the normalization unit 252 may use, in the normalization, a well-known normalization method in NPL 4 or the like. For example, the normalization unit 252 may acquire an in-plane rotation angle of a face, from coordinate values of integrated face feature points of pupil centers of both eyes, performs reverse rotation such that the right eye and the left eye become horizontal, and performs normalization into an image having a size of 64×64 pixels.

Note that the above-described normalization method performed by the normalization unit 252 is one example, and another well-known normalization method may be used.

Subsequently, the collation unit 253 calculates a face collation template from an image normalized by the normalization unit 252, collates the calculated template with a face collation template stored in the template storage unit 254, and calculates a face collation score (step S340).

Herein, an arbitrary template may be used as the face collation template. For example, a template using a feature quantity of a histogram of oriented gradients (HOG) extracted from a normalized image, or a template using a normalized image itself as a feature quantity may be used. Further, for example, normalized correlation or a Euclid distance may be used in calculating a score of collation between templates.

The collation unit 253 may calculate a collation score f, by using a normalized image having a size of 64×64 pixels described in NPL 4, for example. Specifically, the collation unit 253 may calculate a collation score f as follows, for example. In other words, the collation unit 253 uses, as a template, a normalized image that has been rearranged into a single row of a 4096-dimensional vector by raster scanning, for example.

When two templates t1 and t2 are given, a collation score f using normalized correlation can be calculated by the following equation (4):

$$f = \langle t1 \cdot t2 \rangle / (\langle t1 \cdot t1 \rangle \times \langle t2 \cdot t2 \rangle)^{(1/2)} \qquad (4)$$

where <t1·t2> designates an inner product of t1 and t2.

The collation score using the normalized correlation becomes the maximum value i.e., one when the two templates are the same vector, and thus becomes a higher value as the templates are more similar to each other. For this reason, the normalized correlation can be used as a face similarity degree.

When a face collation score calculated as described above is larger than a threshold value, the collation unit 253 may determine that a collation-target template matches a face collation template stored in the template storage unit 254. When the face collation template is successfully matched, it can be specified that the collation-target template includes a person represented by the face collation template (the original person exists).

Note that the above-described feature quantity and face collation method used by the collation unit 253 are examples, and other well-known feature quantity and face collation method may be used.

The collation unit 253 notifies the output unit 270 of a collation result. The output unit 270 outputs the collation result acquired from the collation unit 253 (step S350). For example, the output unit 270 may display, on a display, a face image, a name, and a collation score of an identified person.

As described above, according to the second example embodiment, from a face image that is a frame acquired from video data and including a face, the face-feature-point candidate detection unit 231 of the facial authentication device 200 detects a plurality of face-feature-point candidates, by using a plurality of different face-feature-point detection methods for a detection-target face feature point. The reliability degree calculation unit 232 calculates a reliability degree of the face image, based on statistical information, such as variance, of a plurality of the detected face-feature-point candidates. Based on the calculated reliability degree, the face image selection unit 233 selects a face image suitable for facial authentication.

According to the second example embodiment, by adopting the above-described configuration, a face image for which a face feature point is detected with high accuracy is selected from face images that are frames constituting video data and each including a face, and the selected face image is used in collation with a face collation template. Thereby, according to the second example embodiment, it is possible to attain an advantageous effect that influence of positional deviation of a detected face feature point can be suppressed, and highly accurate facial authentication can be achieved.

Further, for the selected face image, the face-feature-point calculation unit 251 calculates as an integrated face feature point an average of respective positions of a plurality of face-feature-point candidates, normalizes the image, by using the integrated face feature point, and uses the normalized image in collation. Thereby, according to the second example embodiment, it is possible to attain an advantageous effect that a face feature point can be detected with more accuracy, and facial authentication can be made with more accuracy.

Note that when the face image selection unit 233 selects a plurality of face images at the processing S240 in FIG. 3, accuracy of facial authentication can be further improved by performing the processing S320 to S340 in FIG. 8 for each of a plurality of the face images.

Figure 10:
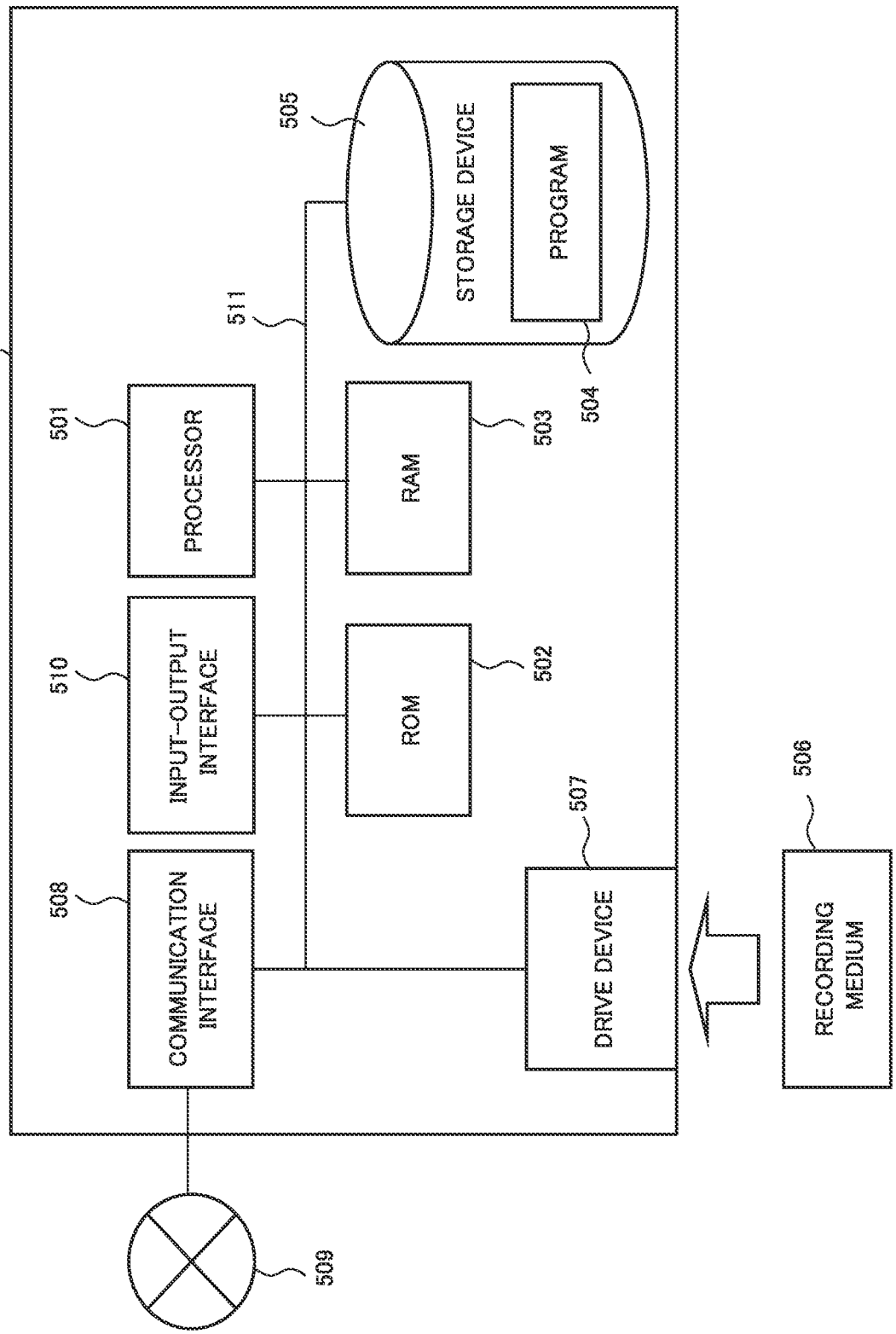
FIG. 10 is a diagram illustrating one example of a hardware configuration of a computer device that implements the facial authentication device of each of the example embodiments.

FIG. 10 is a diagram illustrating one example of a hardware configuration of a computer device 500 that implements the facial authentication device of each of the example embodiments. Note that in each of the example embodiments of the present invention, each constituent element of each device represents a block of a functional unit. Each constituent element of each device can be implemented by an arbitrary combination of software and the computer device 500 as illustrated in FIG. 10 for example.

As illustrated in FIG. 10, the computer device 500 includes a processor (CPU) 501, a read only memory (ROM) 502, a random access memory (RAM) 503, a storage device 505, a drive device 507, a communication interface 508, an input-output interface 510, and a bus 511.

The storage device 505 stores a program 504. The drive device 507 performs reading and writing to and from a recording medium 506. The communication interface 508 is connected to a network 509. The input-output interface 510 outputs and inputs data. The bus 511 connects the respective constituent elements to each other.

The processor 501 executes the program 504, by using the RAM 503. The program 504 may be stored in the ROM 502. Alternatively, the program 504 may be recorded in the recording medium 506 and is read by the drive device 507, or may be transmitted from an external device via the network 509. The communication interface 508 exchanges data with an external device via the network 509. The input-output interface 510 exchanges data with peripheral devices (such as a keyboard, a mouse, and a display device). The communication interface 508 and the input-output interface 510 can function as a means for acquiring or outputting data. Data such as output information may be stored in the storage device 505, or may be included in the program 504.

Note that there are various modified examples of a method for implementing the facial authentication device. For example, the facial authentication device can be implemented as a dedicated device. The facial authentication device can be implemented by a combination of a plurality of devices.

The template storage unit 254 in the facial authentication device may be implemented by the storage device 505.

Further, the detection unit 110, the reliability degree calculation unit 120, the selection unit 130, the input unit 210, the face-feature-point candidate detection unit 231, the reliability degree calculation unit 232, the face image selection unit 233, the integrated face-feature-point calculation unit 251, the normalization unit 252, the collation unit 253, and the output unit 270 in the facial authentication device may be implemented by the processor 501 that performs processing in accordance with program control, for example.

Furthermore, the category of each of the example embodiments includes a processing method in which a program for activating the functions so as to be implemented is recorded in the recording medium 506, and the program recorded in the recording medium 506 is read as codes and is executed in a computer. In other words, the computer-readable recording medium 506 is also included in the scope of each of the example embodiments. In addition, not only the recording medium 506 in which the above-described program has been recorded but also the program itself are included in each of the example embodiments.

The present invention is described above with reference to the above-described example embodiments. However, the present invention is not limited to the above-described example embodiments. In other words, according to the present invention, various forms such as various combinations and selections of the above-disclosed various elements that can be understood by those skilled in the art can be applied within the scope of the present invention.

The present application claims priority based on Japanese Patent Application No. 2017-124335 filed on Jun. 26, 2017, the entire disclosure of which is incorporated herein.

REFERENCE SIGNS LIST

100 Facial authentication device
110 Detection unit
120 Reliability degree calculation unit
130 Selection unit
200 Facial authentication device
210 Input unit
230 Selection unit
231 Face-feature-point candidate detection unit
232 Reliability degree calculation unit
233 Face image selection unit
250 Authentication unit
251 Integrated face-feature-point calculation unit
252 Normalization unit
253 Collation unit
254 Template storage unit
270 Output unit
500 Computer device
501 Processor
502 ROM
503 RAM
504 Program
505 Storage device
506 Recording medium
507 Drive device
508 Communication interface
509 Network
510 Input-output interface
511 Bus

The invention claimed is:

1. A facial authentication device comprising:
at least one memory storing instructions; and
at least one processor configured to execute the instructions to perform:
detecting, from each of a plurality of face images of a face of a same person, a plurality of face-feature-point candidates of a pupil center in an eye of the face, by applying a plurality of different methods to each of the plurality of face images;
calculating first coordinate values of the plurality of face-feature-point candidates detected from each of the plurality of face images by using a first method;
calculating second coordinate values of the plurality of face-feature-point candidates detected from each of the plurality of face images by using a second method;
calculating at least one of a variation and a standard deviation of the first coordinate values and the second coordinate values for each of the plurality of face images;
calculating a reliability degree of each of the plurality of face images based on the at least one of the variation and the standard deviation; and
selecting, from the plurality of face images, one face image of which the variation or the standard deviation is smallest based on the reliability degree.

2. The facial authentication device according to claim 1, wherein
the at least one processor is configured to execute the instructions to perform:
calculating, for the one face image selected from the plurality of face images, an integrated face feature point to be used in authentication of the face.

3. The facial authentication device according to claim 1, wherein
the plurality of face images are consecutive face images constituting a moving image.

4. A facial authentication method performed by a computer and comprising:
detecting, from each of a plurality of face images of a face of a same person, a plurality of face-feature-point candidates of a pupil center in an eye of the face, by applying a plurality of different methods to each of the plurality of face images;
calculating first coordinate values of the plurality of face-feature-point candidates detected from each of the plurality of face images by using a first method;
calculating second coordinate values of the plurality of face-feature-point candidates detected from each of the plurality of face images by using a second method;
calculating at least one of a variation and a standard deviation of the first coordinate values and the second coordinate values for each of the plurality of face images;
calculating a reliability degree of each of the plurality of face images based on the at least one of the variation and the standard deviation; and
selecting, from the plurality of face images, one face image of which the variation or the standard deviation is smallest based on the reliability degree.

5. The facial authentication method according to claim 4, wherein
the facial authentication method comprises:
calculating, for the one face image selected from the plurality of face images, an integrated face feature point to be used in authentication of the face.

6. The facial authentication method according to claim 4, wherein
the plurality of face images are consecutive face images constituting a moving image.

7. A non-transitory program recording medium storing a program executable by a computer to perform processing comprising:
detecting, from each of a plurality of face images of a face of a same person, a plurality of face-feature-point candidates of a pupil center in an eye of the face, by applying a plurality of different methods to each of the plurality of face images;
calculating first coordinate values of the plurality of face-feature-point candidates detected from each of the plurality of face images by using a first method;
calculating second coordinate values of the plurality of face-feature-point candidates detected from each of the plurality of face images by using a second method;
calculating at least one of a variation and a standard deviation of the first coordinate values and the second coordinate values for each of the plurality of face images;

calculating a reliability degree of each of the plurality of face images based on the at least one of the variation and the standard deviation; and selecting, from the plurality of face images, one face image of which the variation or the standard deviation is smallest based on the reliability degree.

8. The non-transitory program recording medium according to claim 7, wherein the processing comprises:

calculating, for the one face image selected from the plurality of face images, an integrated face feature point to be used in authentication of the face.

9. The non-transitory program recording medium according to claim 7, wherein the plurality of face images are consecutive face images constituting a moving image.

\* \* \* \* \*